US012534933B2

(12) United States Patent
Turcotte et al.

(10) Patent No.: US 12,534,933 B2
(45) Date of Patent: Jan. 27, 2026

(54) DOOR LATCH DIRECT VISUAL INDICATION

(71) Applicant: Textron Innovations Inc., Providence, RI (US)

(72) Inventors: Tomy Turcotte, Terrebonne (CA); Guillaume Noiseux-Boucher, Mirabel (CA)

(73) Assignee: Textron Innovations Inc., Providence, RI (US)

( * ) Notice: Subject to any disclaimer, the term of this patent is extended or adjusted under 35 U.S.C. 154(b) by 238 days.

(21) Appl. No.: 18/203,724

(22) Filed: May 31, 2023

(65) Prior Publication Data

US 2024/0401372 A1 Dec. 5, 2024

(51) Int. Cl.

| | |
|---|---|
| ***E05B 41/00*** | (2006.01) |
| ***E05B 77/14*** | (2014.01) |
| ***E05B 83/36*** | (2014.01) |
| *B64C 1/14* | (2006.01) |

(52) U.S. Cl.

CPC .............. *E05B 41/00* (2013.01); *E05B 77/14* (2013.01); *E05B 83/36* (2013.01); *B64C 1/1423* (2013.01)

(58) Field of Classification Search

CPC .......... E05B 41/00; E05B 77/14; E05B 83/36; B64C 1/1423

See application file for complete search history.

(56) References Cited

U.S. PATENT DOCUMENTS

| | | | | |
|---|---|---|---|---|
| 3,572,789 | A * | 3/1971 | McClintock | E05B 65/0817 292/114 |
| 4,510,779 | A * | 4/1985 | Ahad | E05B 5/00 292/DIG. 31 |
| 5,011,200 | A * | 4/1991 | Glancy | E05C 19/145 292/DIG. 60 |
| 2004/0227359 | A1 * | 11/2004 | Coleman | E05B 81/16 292/254 |
| 2006/0038410 | A1 * | 2/2006 | Pratt | E05B 47/0012 292/144 |
| 2009/0134637 | A1 * | 5/2009 | Baic | E05C 3/048 292/205 |
| 2014/0007404 | A1 * | 1/2014 | Krishnan | E05B 81/58 29/428 |
| 2017/0066533 | A1 * | 3/2017 | Long | B64D 11/003 |
| 2018/0119926 | A1 * | 5/2018 | Bachman | B64D 45/0005 |

(Continued)

*Primary Examiner* — Mark A Williams

(74) *Attorney, Agent, or Firm* — Frost Brown Todd LLP

(57) ABSTRACT

A latch mechanism for a door of an aircraft comprises a striker pin and a catch assembly. The catch assembly includes a housing, which includes a first aperture and a first outboard surface aligned with the first aperture. The catch assembly also includes a catch pivotably coupled to the housing. The catch includes a recess configured to selectively receive the striker pin. The catch also includes a hook extending at least partially through the first aperture. The hook includes a second outboard surface configured to selectively cover the first outboard surface. The catch is pivotable relative to the housing between an open orientation in which the second outboard surface at least partially reveals the first outboard surface, and a lock orientation in which the second outboard surface substantially conceals the first outboard surface. The recess is configured to receive the striker pin when the catch is in the lock orientation.

17 Claims, 11 Drawing Sheets

(56) References Cited

U.S. PATENT DOCUMENTS

| | | | | |
|---|---|---|---|---|
| 2018/0171664 | A1* | 6/2018 | Frommer | E05B 41/00 |
| 2018/0209185 | A1* | 7/2018 | Long | B64D 11/02 |
| 2020/0156799 | A1* | 5/2020 | Micallef | E05B 41/00 |
| 2021/0087865 | A1* | 3/2021 | Brownlie | E05B 41/00 |

* cited by examiner

DOOR LATCH DIRECT VISUAL INDICATION

TECHNICAL FIELD

The present disclosure directed to a door latch mechanism for an aircraft and, more particularly, to a rotary lock-style door latch mechanism configured to provide a direct visual indication of a state of the latch mechanism (e.g., open state, security state, and/or lock state).

BACKGROUND OF THE INVENTION

Rotorcraft, such as helicopters and tiltrotors, and other types of aircraft typically include one or more external doors for facilitating access to an interior portion of the fuselage of the aircraft. Such external doors may include, for example, one or more passenger doors for facilitating access to a cabin of the aircraft; one or more crew doors for facilitating access to a cockpit or flight deck of the aircraft; one or more cargo doors for facilitating access to a cargo hold of the aircraft; and/or one or more service doors for facilitating access to a service compartment of the aircraft. Each door may be equipped with at least one corresponding latch mechanism for selectively securing the door in a closed position to prevent inadvertent opening of the door. Various types of latch mechanisms may be used, such as a rotary lock-style latch mechanism or a deadbolt-style latch mechanism. In some instances, such as prior to takeoff, crew members (e.g., ground crew members and/or flight crew members) may be required to confirm that a latch mechanism is in the lock state from a position exterior to the aircraft. For example, a crew member may push firmly against the region(s) of the door at which each latch mechanism is located in order to obtain a tactile indication of whether each latch mechanism is in the lock state.

BRIEF SUMMARY OF THE INVENTION

In a first aspect, the present disclosure is directed to a latch mechanism for a door of an aircraft, comprising: (a) a striker pin configured to be coupled to one of the door or a doorframe of the aircraft; and (b) a catch assembly, wherein the catch assembly includes: (i) a housing configured to be coupled to the other of the door or the doorframe of the aircraft, wherein the housing includes: (A) a first aperture, and (B) a first outboard surface aligned with the first aperture, and (ii) a catch pivotably coupled to the housing, wherein the catch includes: (A) a recess configured to selectively receive the striker pin, and (B) a hook extending at least partially through the first aperture, wherein the hook includes a second outboard surface configured to selectively cover the first outboard surface of the housing, wherein the catch is pivotable relative to the housing between an open orientation in which the second outboard surface of the hook at least partially reveals the first outboard surface of the housing, and a lock orientation in which the second outboard surface of the hook substantially conceals the first outboard surface of the housing, wherein the recess is configured to receive the striker pin when the catch is in the lock orientation. In some embodiments, the first outboard surface of the housing includes an indicator strip. In other embodiments, the second outboard surface of the hook includes an indicator strip. The second outboard surface of the hook may have a width substantially equal to or greater than a width of the first outboard surface of the housing, and may have a height substantially equal to or greater than a height of the first outboard surface of the housing. In some embodiments, the second outboard surface is configured to provide a visual contrast relative to the first outboard surface. In addition or alternatively, the hook may be generally L-shaped.

In some embodiments, the catch assembly further includes a bracket configured to couple the housing to the other of the door or the doorframe of the aircraft, wherein the bracket includes a second aperture aligned with the first outboard surface to permit visual observation of the first outboard surface through the second aperture at least when the catch is in the open orientation. In addition or alternatively, the catch assembly may further include a cam pivotably coupled to the housing, wherein the cam is configured to pivot relative to the housing to thereby urge the catch between the open and lock orientations. For example, the catch may include a pair of notches, and the cam may include a tooth configured to selectively engage the notches.

In a second aspect, the present disclosure is directed to an aircraft comprising: (a) a fuselage, wherein the fuselage includes a doorframe; (b) a door movably coupled to the doorframe; and (c) the latch mechanism of the first aspect, wherein the striker pin is coupled to the doorframe, wherein the housing is coupled to the door. In some embodiments, the door includes a porthole aligned with the first outboard surface to permit visual observation of the first outboard surface from an exterior of the fuselage through the porthole at least when the catch is in the open orientation. The porthole may extend from an internal side of the door to an external side of the door. In addition or alternatively, the porthole may comprise a substantially transparent material. In some embodiments, the housing is coupled to the door via a bracket, wherein the bracket includes a second aperture aligned with the porthole and the first outboard surface to permit visual observation of the first outboard surface through the second aperture at least when the catch is in the open orientation. In addition or alternatively, the door may include a door handle operatively coupled to the catch for actuating pivoting of the catch between the open and lock states.

In a third aspect, the present disclosure is directed to a catch assembly for a door of an aircraft, comprising: (a) a housing configured to be coupled to one of the door or a doorframe of the aircraft, wherein the housing includes: (i) a first aperture, and (ii) a first outboard surface aligned with the first aperture, and (b) a catch pivotably coupled to the housing, wherein the catch includes: (i) a recess configured to selectively receive a striker pin of the aircraft, and (ii) a hook extending at least partially through the first aperture, wherein the hook includes a second outboard surface configured to selectively cover the first outboard surface of the housing, wherein the catch is pivotable relative to the housing between an open orientation in which the second outboard surface of the hook at least partially reveals the first outboard surface of the housing, and a lock orientation in which the second outboard surface of the hook substantially conceals the first outboard surface of the housing, wherein the recess is configured to receive the striker pin when the catch is in the lock orientation. In some embodiments, the catch assembly further comprises a bracket configured to couple the housing to the one of the door or the doorframe of the aircraft, wherein the bracket includes a second aperture aligned with the first outboard surface to permit visual observation of the first outboard surface through the second aperture at least when the catch is in the open orientation. In addition or alternatively, the catch assembly may further comprise a cam pivotably coupled to the housing, wherein the cam is configured to pivot relative to the housing to thereby urge the catch between the open and lock orientations.

In a fourth aspect, the present disclosure is directed to a method of locking a door of an aircraft, comprising: (a) moving the door relative to a fuselage of the aircraft from an open position toward a closed position; and (b) pivoting a catch relative to a housing coupled to one of the door or the fuselage from an open orientation in which a hook of the catch at least partially reveals a first outboard surface of the housing, to a lock orientation in which the hook substantially conceals the first outboard surface and in which a recess of the catch receives a striker pin of the aircraft. In some embodiments, the method further comprises visually observing a second outboard surface of the hook from an exterior of the fuselage.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

As discussed above, a crew member may push firmly against a door and gauge with a tactile indication whether each latch mechanism is in the lock state. However, such a tactile indication may be considered to be generally unreliable, since the tactile indication is dependent on the pushing of the door by the crew member and thus may vary based on the strength of the crew member, the amount of force applied by the crew member against the door, the ability of the crew member to properly determine whether the appropriate tactile indication has been obtained, etc. Embodiments under the present disclosure can provide more reliable confirmation of a latched and secure door.

Figure 1:
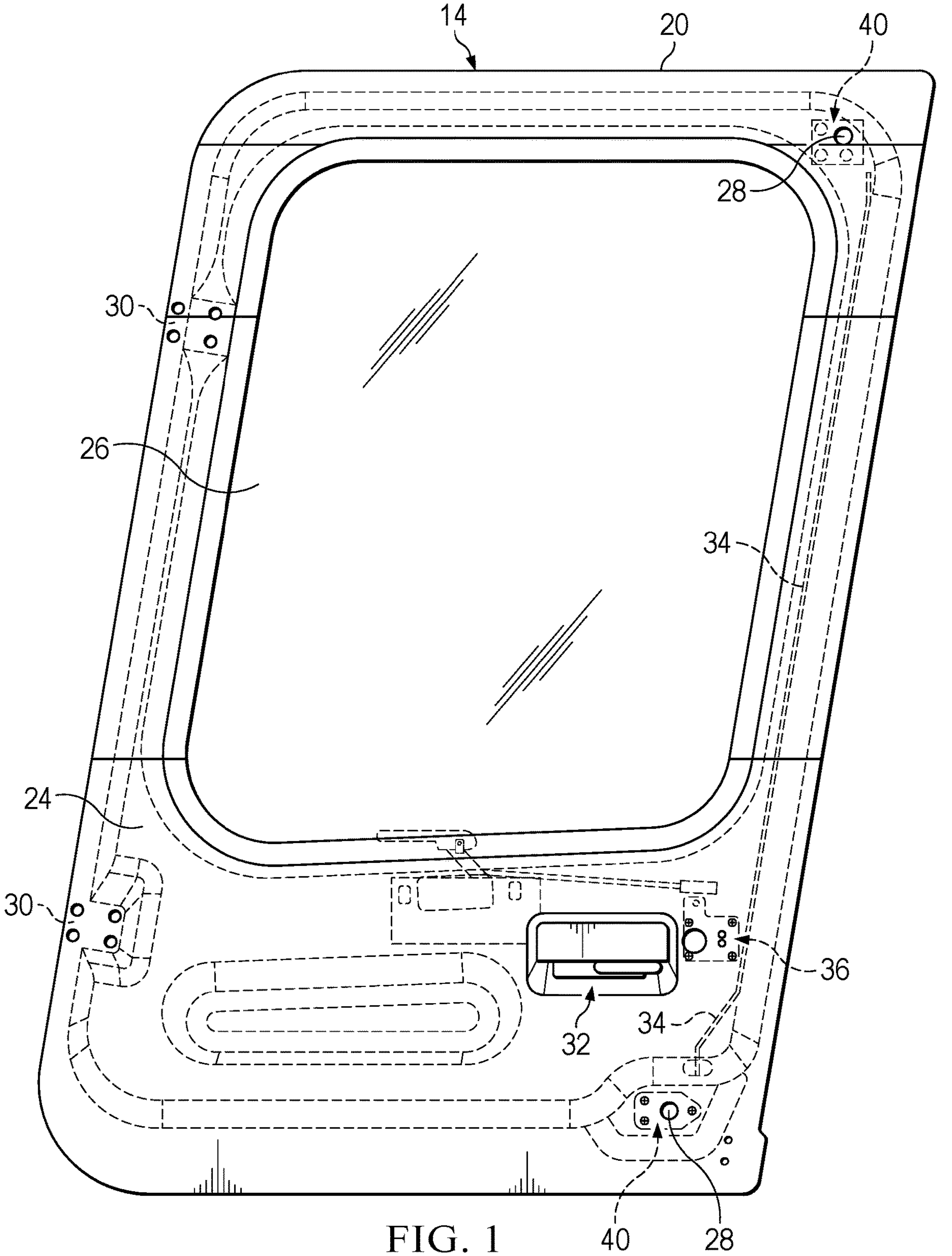
FIG. 1 is a side elevational view of an example of a door of an aircraft having upper and lower latch mechanisms.
Figure 2:
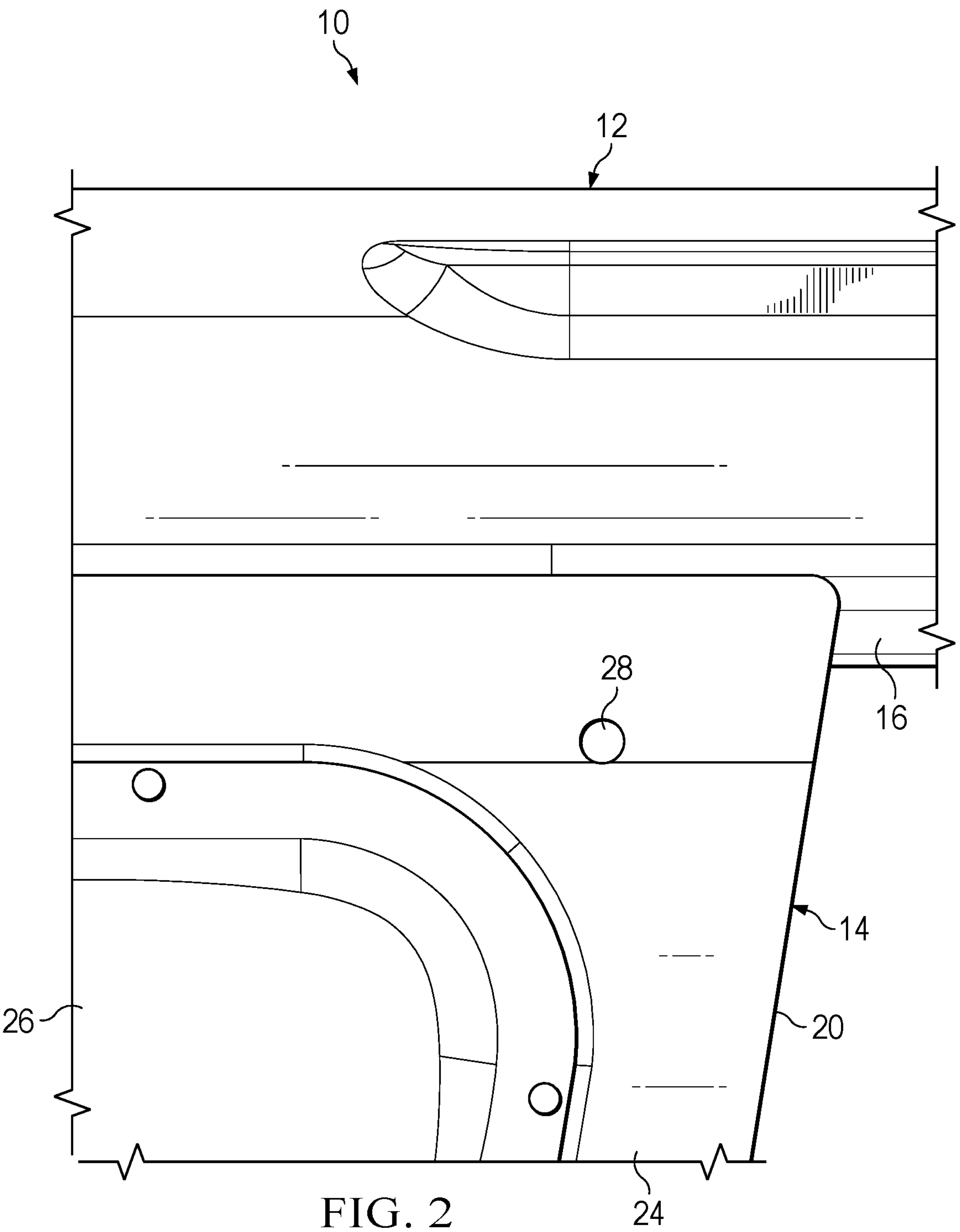
FIG. 2 is an enlarged side elevational view of a portion of the door of FIG. 1, showing an upper portion of a doorframe of the aircraft.
Figure 3:
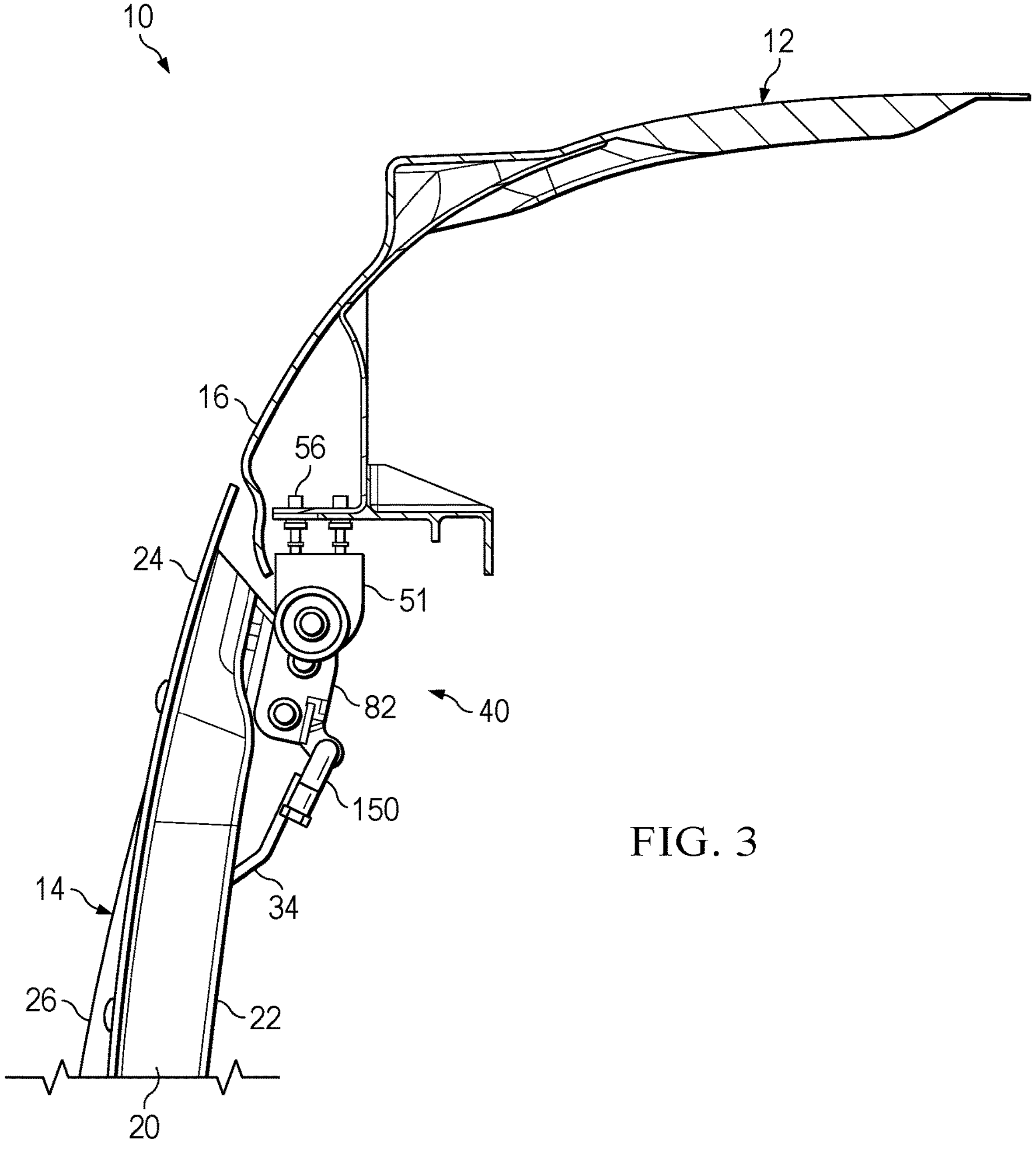
FIG. 3 is a partial rear elevational view of the door and doorframe of FIG. 2, showing the upper latch mechanism.

Referring now to FIGS. 1-3, an example of an aircraft in the form of a helicopter (10) includes an airframe having a fuselage (12) and at least one external door (14) for facilitating access to an interior portion of fuselage (12). For example, door (14) may facilitate access to any one or more of a cabin of helicopter (10), a cockpit or flight deck of helicopter (10), a cargo hold of helicopter (10), and/or a service compartment of helicopter (10). Helicopter (10) also includes a rotor system with a plurality of rotor blades (not shown), and may further include a tail rotor or anti-torque system, an empennage, and/or a tail structure (not shown).

Fuselage (12) of the present version includes a doorframe (16) that defines an opening between an exterior of fuselage (12) and an interior portion of fuselage (12), and which may be selectively covered and uncovered by door (14). While only an upper, horizontal portion of doorframe (16) is shown, it will be appreciated that doorframe (16) may further include a lower, horizontal portion and a pair of vertical portions. Such horizontal and vertical portions may collectively define the opening and/or collectively extend fully about a periphery of door (14).

Door (14) of the present version includes at least one door panel (20) having an internal side (22) and an external side (24), and a window (26) for providing visibility through door (14) between the exterior of fuselage (12) and the interior portion of fuselage (12). In the example shown, door (14) also includes upper and lower, generally cylindrical portholes (28) extending between the internal and external sides (22, 24) of the at least one door panel (20), the purposes of which are described below. Each porthole (28) comprises a substantially transparent material, such as a transparent acrylic plastic or glass material. As shown in FIG. 1, upper and lower door hinge mounts (30) are positioned along a leading (e.g., forward) edge of door panel (20) for coupling to respective hinges (not shown) to thereby pivotably couple door (14) to doorframe (16), such that door (14) may be selectively pivoted relative to doorframe (16) about such hinges between a closed position in which door (14) covers the opening defined by doorframe (16), and an open position in which door (14) at least partially uncovers the opening defined by doorframe (16). While door (14) of the present version is configured to be pivotably coupled to doorframe (16) via hinges, it will be appreciated that door (14) may be configured to be movably coupled to doorframe (16) in any other suitable manner. For example, door (14)

may be configured to be slidably coupled to doorframe (16). Door (14) further includes a door handle (32) pivotably coupled to external side (24) of door panel (20) for manipulation by a crew member to move door (14) between the open and closed positions, for example. As described in greater detail below, door handle (32) is operatively coupled to a pair of rods (34), such that pivoting of door handle (32) relative to door panel (20) may actuate movement of rods (34). In the example shown, door (14) also includes a handle lock (36) operatively coupled to door handle (32) and configured to selectively permit and prevent pivoting of door handle (36), and thus actuation of rods (34).

In this regard, door (14) of the present version is equipped with upper and lower rotary lock-style latch mechanisms (40) positioned at or near a trailing (e.g., aft) edge of door panel (20) and configured to selectively assume a lock state for securing door (14) in the closed position to prevent inadvertent opening of door (14). Door handle (32) is operatively coupled to each latch mechanism (40) via a corresponding rod (34), such that pivoting of door handle (32) may transition latch mechanisms (40) away from the lock state (e.g., when such pivoting is permitted by handle lock (36)) and thereby enable opening of door (14).

Figure 4:
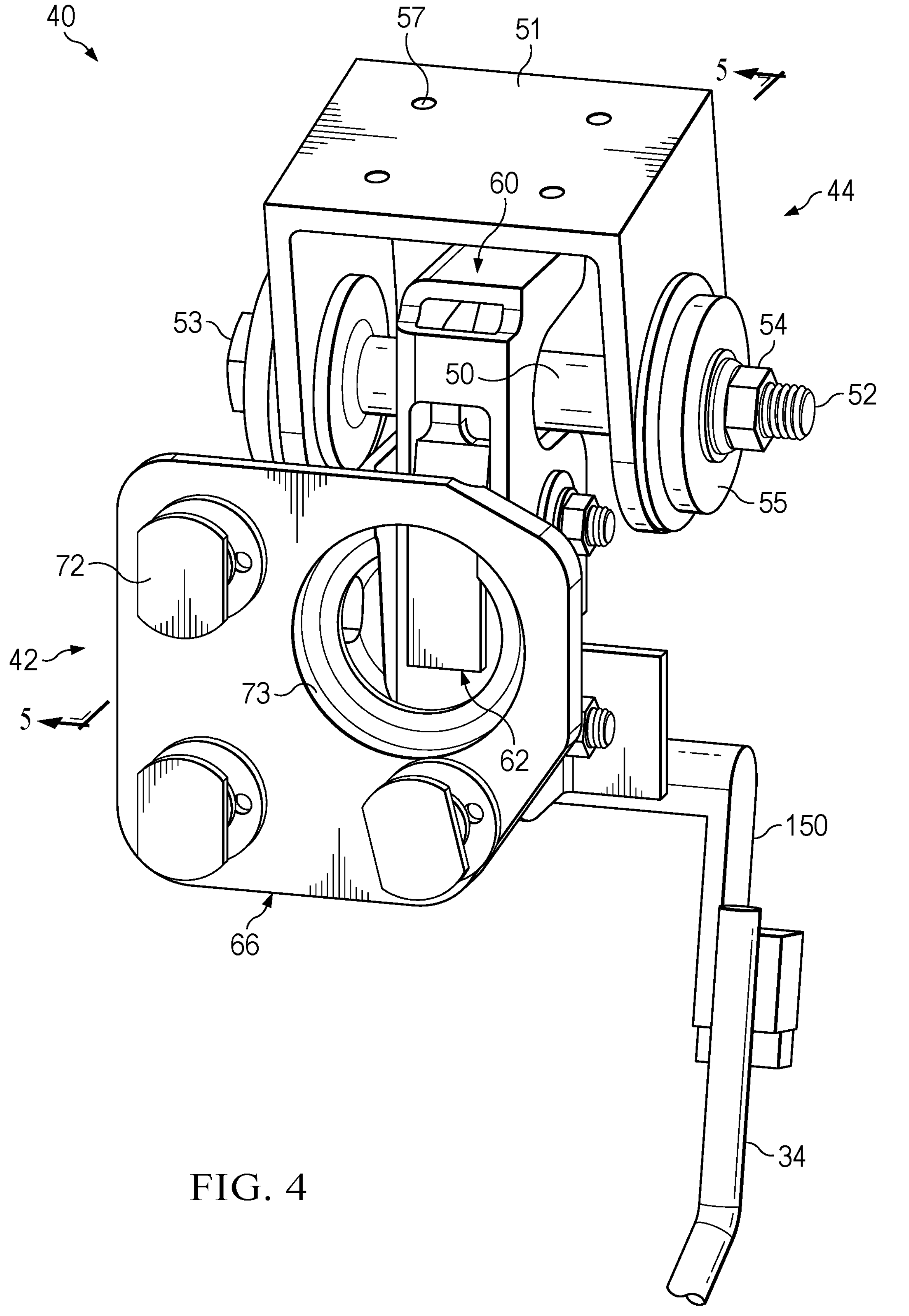
FIG. 4 is a perspective view of the latch mechanism of FIG. 3.
Figure 5:
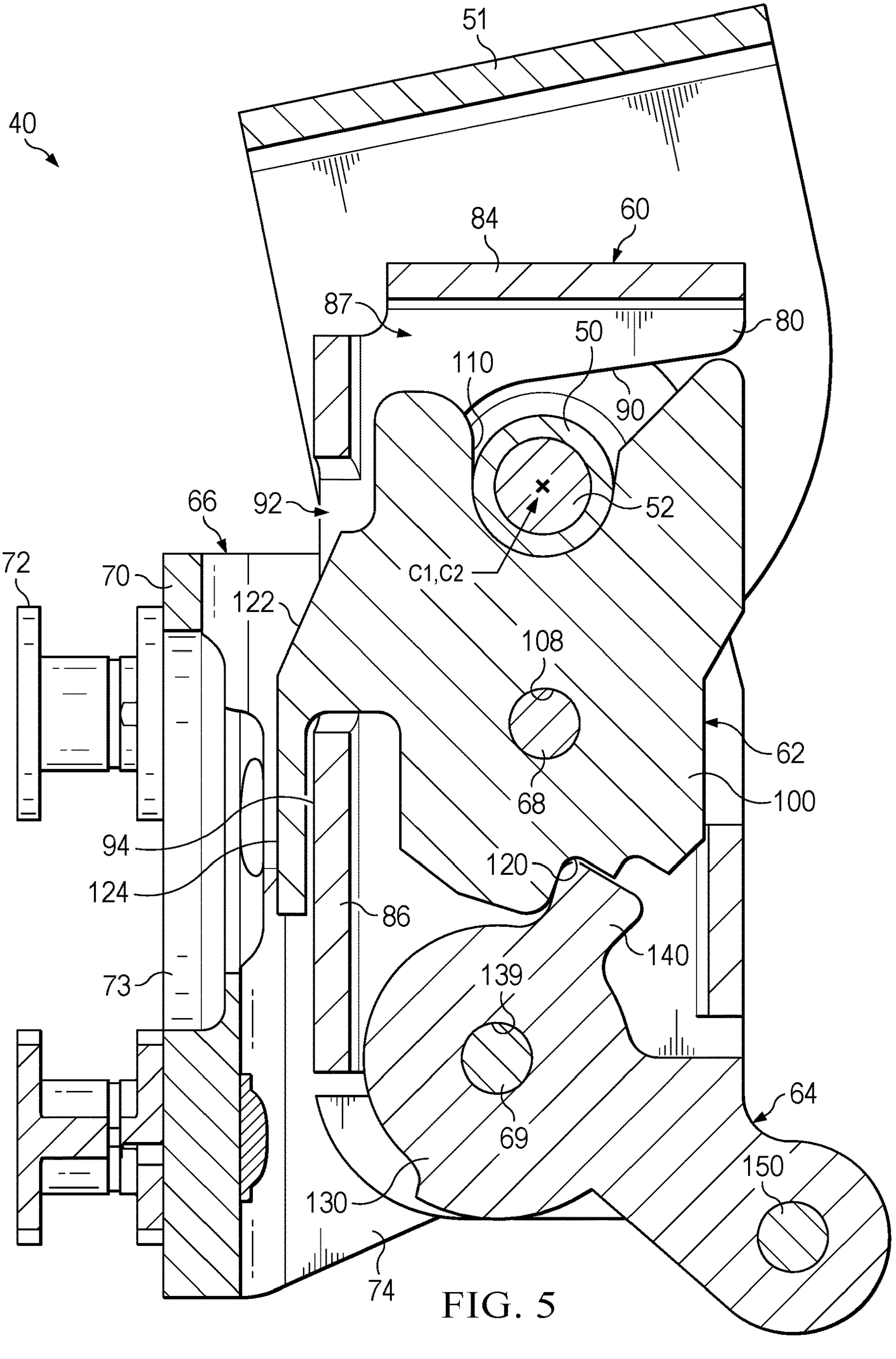
FIG. 5 is a cross-sectional view of the latch mechanism of FIG. 3, taken along line 5-5 in FIG. 4.

Referring now to FIGS. 4-5, each latch mechanism (40) includes a catch assembly (42) coupled to door (14) and a striker pin assembly (44) coupled to doorframe (16). More particularly, each striker pin assembly (44) includes a striker pin (50) carried by a striker pin support in the form of a shackle (51) and secured thereto via a bolt (52) extending longitudinally through striker pin (50) and having a head (53); a nut (54) secured to an end of bolt (52) opposite head (53); and a plurality of washers (55). Each shackle (51) is securely fastened to doorframe (16) via a plurality of fasteners (56) (FIG. 3) extending through corresponding bores (57) of shackle (51). In the example shown, the striker pin assembly (44) of upper latch mechanism (40) is coupled to the upper portion of doorframe (16) and extends downwardly therefrom such that the striker pin assembly (44) may protrude at least slightly into the opening defined by doorframe (16), with striker pin (50) extending substantially parallel to the longitudinal axis of helicopter (10). While catch assembly (42) and striker pin assembly (44) of the present version are coupled to door (14) and doorframe (16), respectively, it will be appreciated that catch assembly (42) and striker pin assembly (44) may alternatively be coupled to doorframe (16) (or any other suitable portion of fuselage (12)) and door (14), respectively, in an inverse arrangement of that shown. For example, door handle (32) may be pivotably coupled to an external side of fuselage (12) in such cases.

Figure 6:
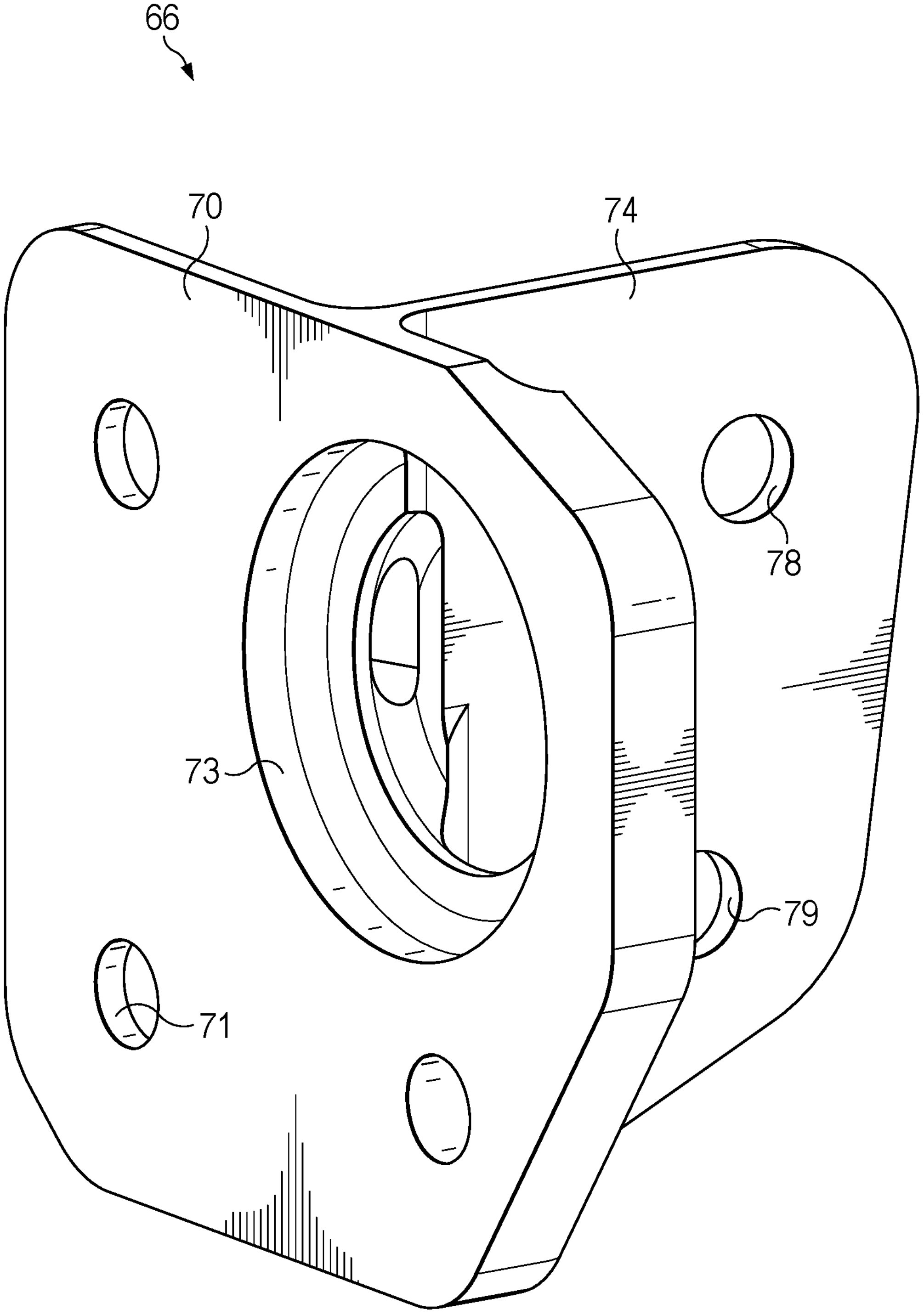
FIG. 6 is a perspective view of a latch bracket of the latch mechanism of FIG. 3.

Each catch assembly (42) includes a housing (60) which at least partially contains both a catch (62) and a cam (64). Each housing (60) is carried by a catch support in the form of a bracket (66) and secured thereto via a pair of support pins, such as upper and lower support pins (68, 69). In this regard, and as shown in FIG. 6, each bracket (66) includes a baseplate (70) having a plurality of bores (71) configured to receive respective fasteners (72) (FIG. 4) for securely fastening bracket (66) to the internal side (22) of door panel (20). Each baseplate (70) also has a generally circular aperture (73) that is aligned with and/or partially receives a corresponding porthole (28) of door (14). Each bracket (66) further includes a flange (74) extending generally orthogonally from an internal side of baseplate (70) and having upper and lower bores (78, 79) configured to receive upper and lower support pins (68, 69), respectively, for securely fastening housing (60) to bracket (66).

Figure 7:
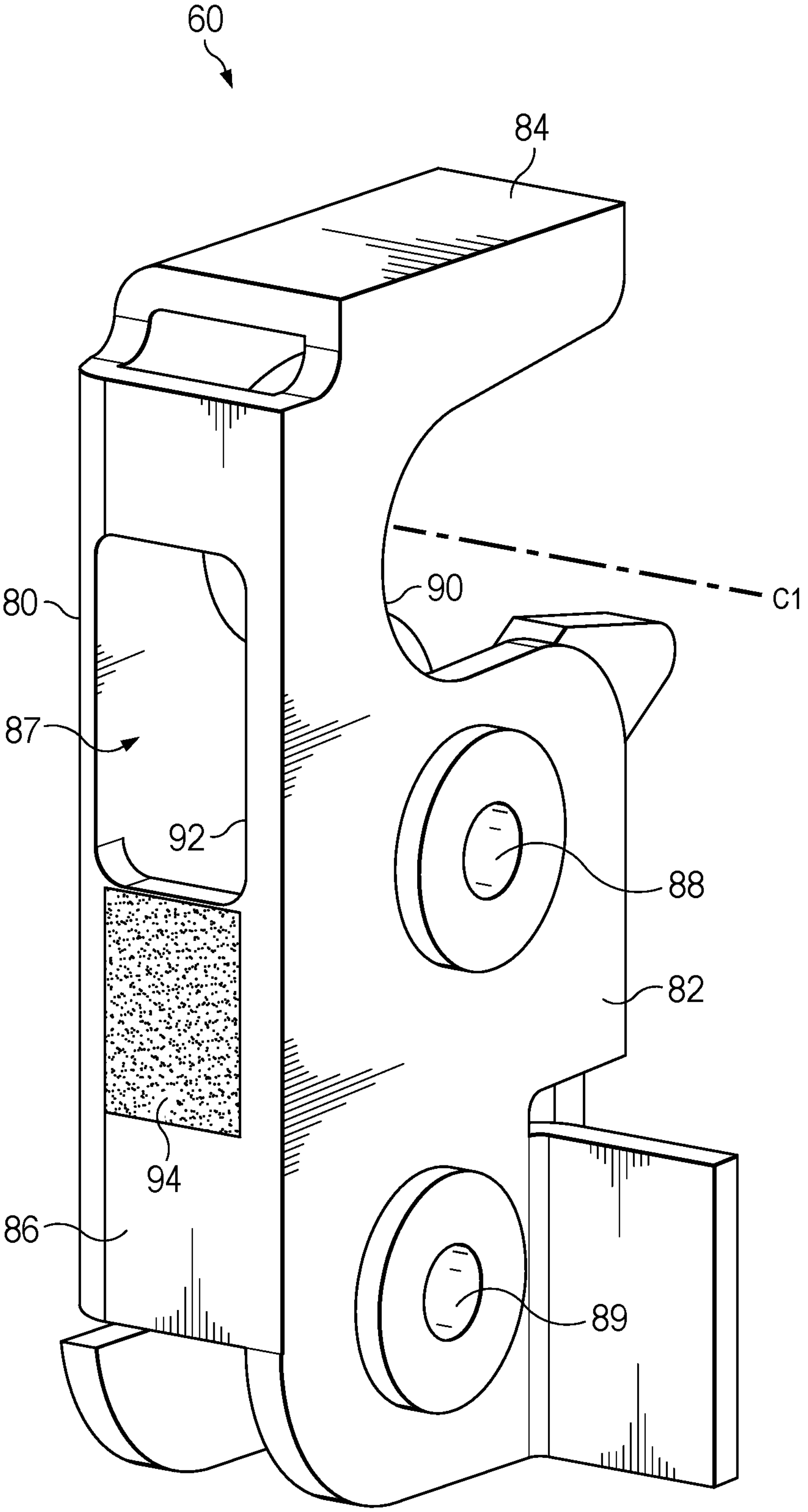
FIG. 7 is a perspective view of a housing of the latch mechanism of FIG. 3.

As shown in FIG. 7, each housing (60) includes a front and rear walls (80, 82) coupled to each other by a top wall (84) and a side wall (86). Walls (80, 82, 84, 86) are spaced relative to each other to collectively define an interior cavity (87) that is sized and configured to receive catch (62) and cam (64). Front and rear walls (80, 82) each have upper and lower bores (88, 89) configured to receive upper and lower support pins (68, 69), respectively, for securely fastening housing (60) to bracket (66), such that each support pin (68, 69) extends across interior cavity (87). In this regard, each support pin (68, 69) is oriented to extend substantially parallel to the longitudinal axis of helicopter (10), and thus substantially parallel to striker pin (50), when door (14) is in the closed position. Front and rear walls (80, 82) each further have a respective C-shaped recess (90) defined along an inboard edge thereof above the respective upper bore (88) and configured to receive striker pin (50) when door (14) is in the closed position. In this regard, C-shaped recesses (90) are each oriented to face laterally inwardly relative to the longitudinal axis of helicopter (10) with a central axis (C1) defined by C-shaped recesses (90) extending substantially parallel to striker pin (50), when door (14) is in the closed position.

Each side wall (86) has a generally rectangular aperture (92) for allowing a portion of the respective catch (62) to pass therethrough, and a visual indicium in the form of an indicator strip (also referred to as a flag area) (94) positioned on an outboard surface of side wall (86) directly below the rectangular aperture (92). Each indicator strip (94) is aligned with a corresponding porthole (28) of door (14) and corresponding circular aperture (73) of bracket (66) to permit visual observation of indicator strip (94) from the exterior of fuselage (12) through the corresponding porthole (28) and corresponding circular aperture (73). In this regard, each indicator strip (94) may be configured to provide a visual contrast relative to the remainder of the outboard surface of the respective side wall (86) and/or relative to any other components that might also be visible from the exterior of fuselage (12) through the corresponding porthole (28) and corresponding circular aperture (73). For example, each indicator strip (94) may be red, while the remainder of the outboard surface of the respective side wall (86) and/or any other components that might also be visible from the exterior of fuselage (12) through the corresponding porthole (28) and corresponding circular aperture (73) may be black, gray, or any other non-red color for providing a visual contrast relative to indicator strip (94).

Figure 8:
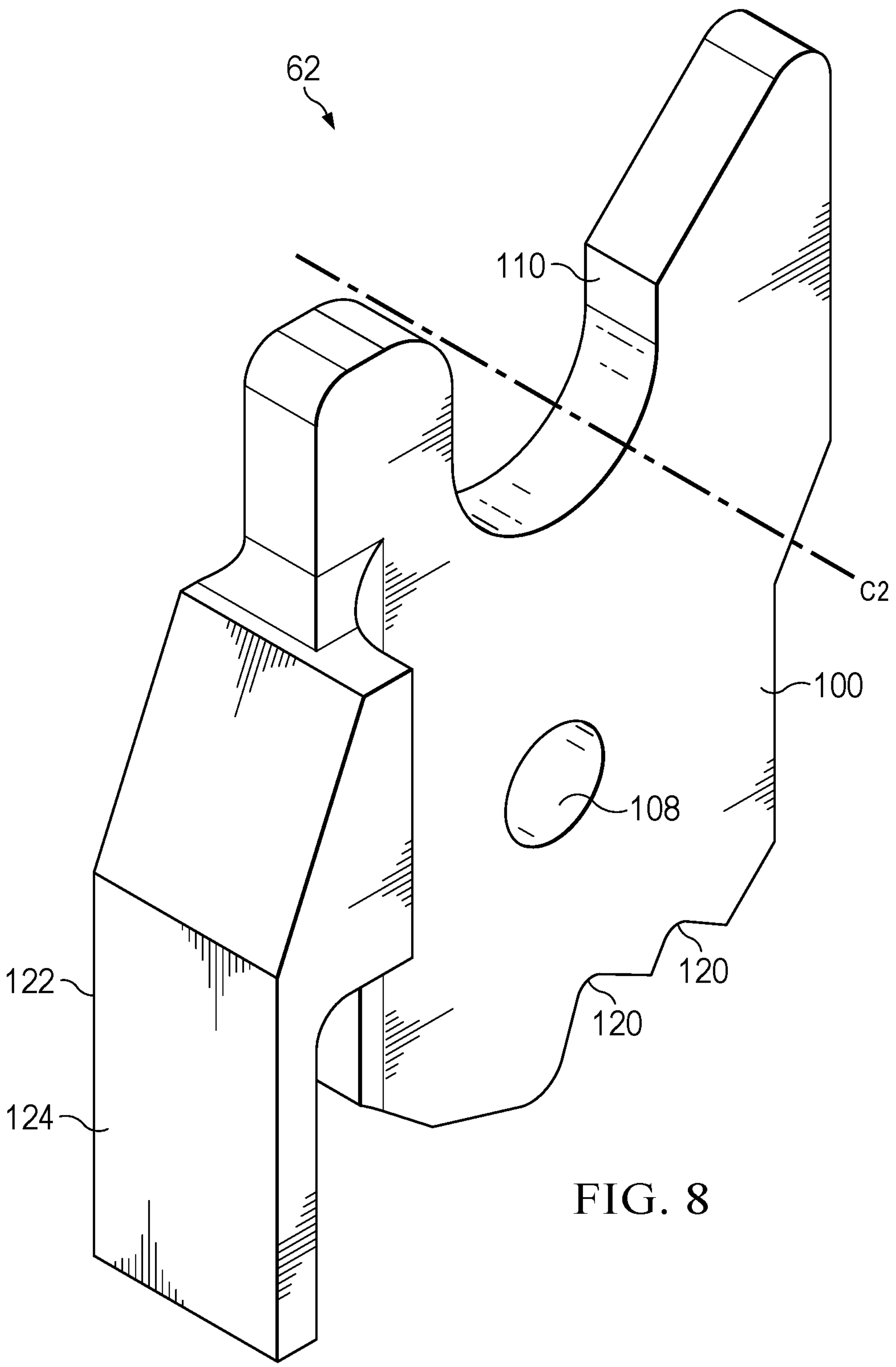
FIG. 8 is a perspective view of a catch of the latch mechanism of FIG. 3.

As shown in FIG. 8, each catch (62) includes a planar body (100) having a bore (108) configured to receive upper support pin (68) for pivotably coupling catch (62) to housing (60) within interior cavity (87). Each planar body (100) further has a respective U-shaped recess (110) defined along an upper edge thereof above the respective bore (108) and configured to receive striker pin (50) when door (14) is in the closed position to thereby securely capture striker pin (50) within the corresponding C-shaped recesses (90). In this regard, each U-shaped recess (110) is oriented to face upwardly with a central axis (C2) defined by U-shaped recess (110) extending substantially parallel to striker pin (50) and coinciding with the central axis (C1) defined by the corresponding C-shaped recesses (90), when door (14) is in the closed position.

More particularly, catch (62) is pivotable relative to housing (60) about upper support pin (68) between a first, fully tilted orientation in which U-shaped recesses (110) are each oriented to face at least partially laterally inwardly relative to the longitudinal axis of helicopter (10) with the central axis (C2) misaligned from the central axis (C1) defined by the corresponding C-shaped recesses (90), and which may at least partially define an open state of latch mechanism (40) (FIG. 9A) such that the first orientation may also be referred to as an open orientation; a second, partially tilted orientation in which U-shaped recesses (110) are each oriented to face less laterally inwardly and more upwardly with the central axis (C2) misaligned from the central axis (C1) defined by the corresponding C-shaped recesses (90), and which may at least partially define a security state of latch mechanism (40) (FIG. 9B) such that the second orientation may also be referred to as a security orientation; and a third orientation in which U-shaped recesses (110) are each oriented to face upwardly with the central axis (C2) coinciding with the central axis (C1) defined by the corresponding C-shaped recesses (90), and which may at least partially define a lock state of latch mechanism (40) (FIG. 9C) such that the third orientation may also be referred to as a lock orientation.

In this regard, each planar body (100) also has a respective pair of notches (120) defined along a lower edge thereof for interacting with cam (64) to facilitate pivoting of catch (62) relative to housing (60) between the orientations described above, as described in greater detail below. Each catch (62) further includes a generally L-shaped hook (122) extending laterally outwardly and downwardly from an outboard edge of the respective planar body (100). More particularly, each hook (122) is sized and configured to extend through the rectangular aperture (92) of the corresponding housing (60) for selectively covering and uncovering the corresponding indicator strip (94). To that end, each hook (122) includes an outboard surface (124) having a width substantially equal to or greater than that of the corresponding indicator strip (94), and a height substantially equal to or greater than that of the corresponding indicator strip (94), such that outboard surface (124) may substantially conceal indicator strip (94) when catch (62) is in the third orientation, may only partially conceal indicator strip (94) when catch (62) is in the second orientation, and may substantially reveal indicator strip (94) when catch (62) is in the first orientation. In this regard, each outboard surface (124) may be configured to provide a visual contrast relative to indicator strip (94). For example, each indicator strip (94) may be red, while each outboard surface (124) may be black, gray, or any other non-red color for providing a visual contrast relative to indicator strip (94). While indicator strip (94) of the version is positioned on the outboard surface of side wall (86) of housing (60), it will be appreciated that indicator strip (94) may alternatively be positioned on outboard surface (124) of hook (122) of catch (62) in an inverse arrangement of that shown.

In this manner, a crew member may readily discern whether catch (62) is in the first, second, or third orientation, and thus whether latch mechanism (40) is in the open, security, or lock state when door (14) is in the closed position based on a visual inspection of indicator strip (94) and/or outboard surface (124) from the exterior of fuselage (12) through the corresponding porthole (28) and corresponding circular aperture (73). For example, the crew member may readily discern that catch (62) is in the first orientation, and thus that latch mechanism (40) is in the open state, by visually observing only indicator strip (94) (e.g., and not any portion of outboard surface (124)) from the exterior of fuselage (12) through the corresponding porthole (28) and corresponding circular aperture (73); that catch (62) is in the second orientation, and thus that latch mechanism (40) is in the security state, by visually observing only a portion of indicator strip (94) and a portion of outboard surface (124) from the exterior of fuselage (12) through the corresponding porthole (28) and corresponding circular aperture (73) when door (14) is in the closed position; and that catch (62) is in the third orientation, and thus that latch mechanism (40) is in the lock state, by visually observing only outboard surface (124) (e.g., and not any portion of indicator strip (94)) from the exterior of fuselage (12) through the corresponding porthole (28) and corresponding circular aperture (73) when door (14) is in the closed position. Thus, the crew member may readily discern that catch (62) is not in the lock state by visually observing any portion of indicator strip (94) from the exterior of fuselage (12) through the corresponding porthole (28) and corresponding circular aperture (73), and may take corrective action to transition catch (62) to the lock state, such as by closing door (14) and/or manipulating door handle (32).

In this regard, and as shown in FIG. 5, cam (64) includes a generally disc-shaped body (130) having a bore (139) configured to receive lower support pin (69) for pivotably coupling cam (64) to housing (60) within interior cavity (87) below catch (62). Cam (64) further has a tooth (140) extending radially outwardly from body (130) and configured to selectively engage notches (120) for urging catch (62) between the first and third orientations, such that pivoting of cam (64) about lower support pin (69) may be converted into pivoting of catch (62) about upper support pin (68). To that end, cam (64) is coupled to the corresponding rod (34) via an input crank (150), and is thereby operatively coupled to door handle (32), such that pivoting of door handle (32) may transition catch (62) between the first and third orientations.

Figure 9A:
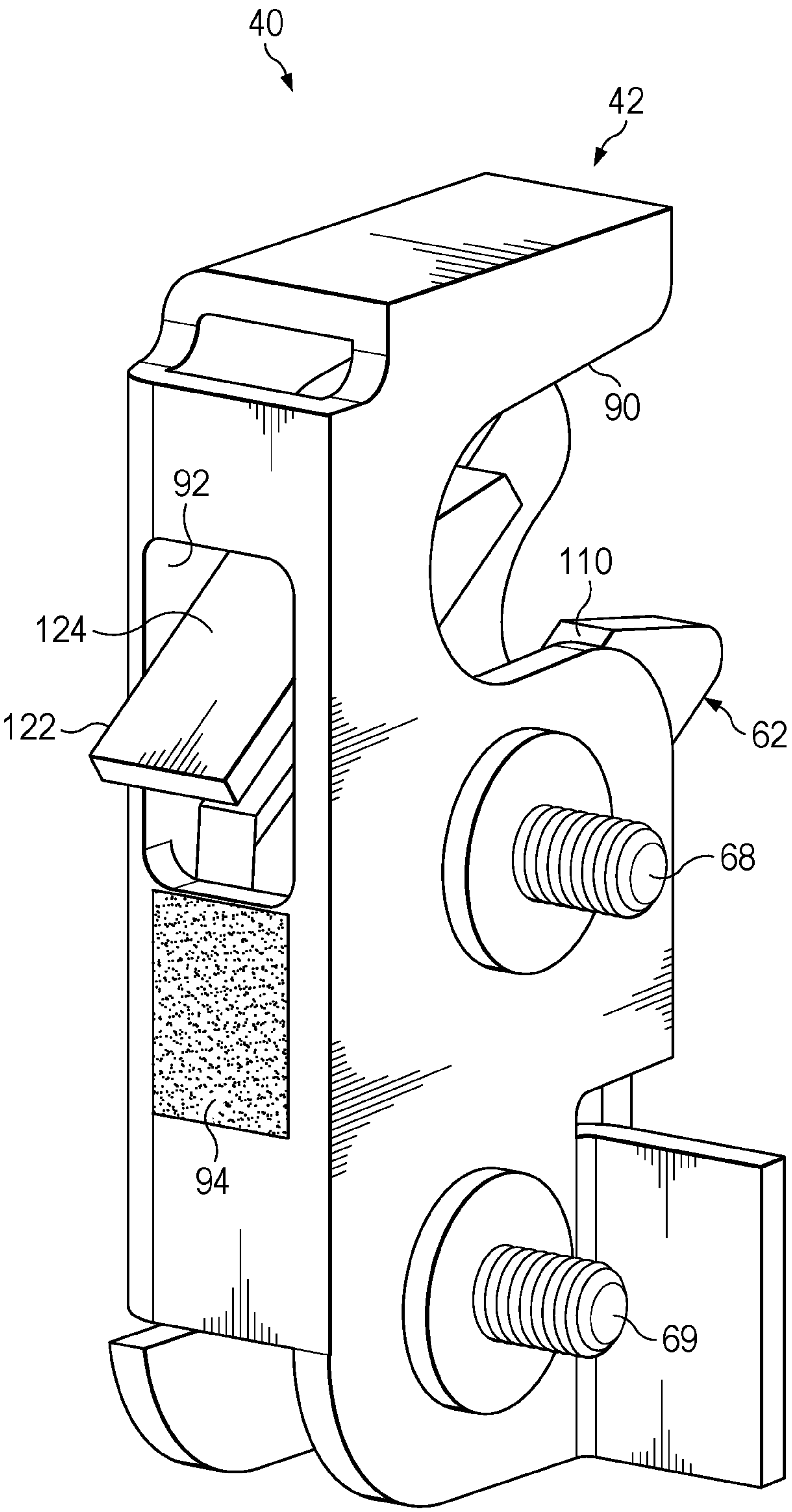
FIG. 9A is a perspective view of a portion of the latch mechanism of FIG. 3, showing the latch mechanism in an open state.
Figure 9B:
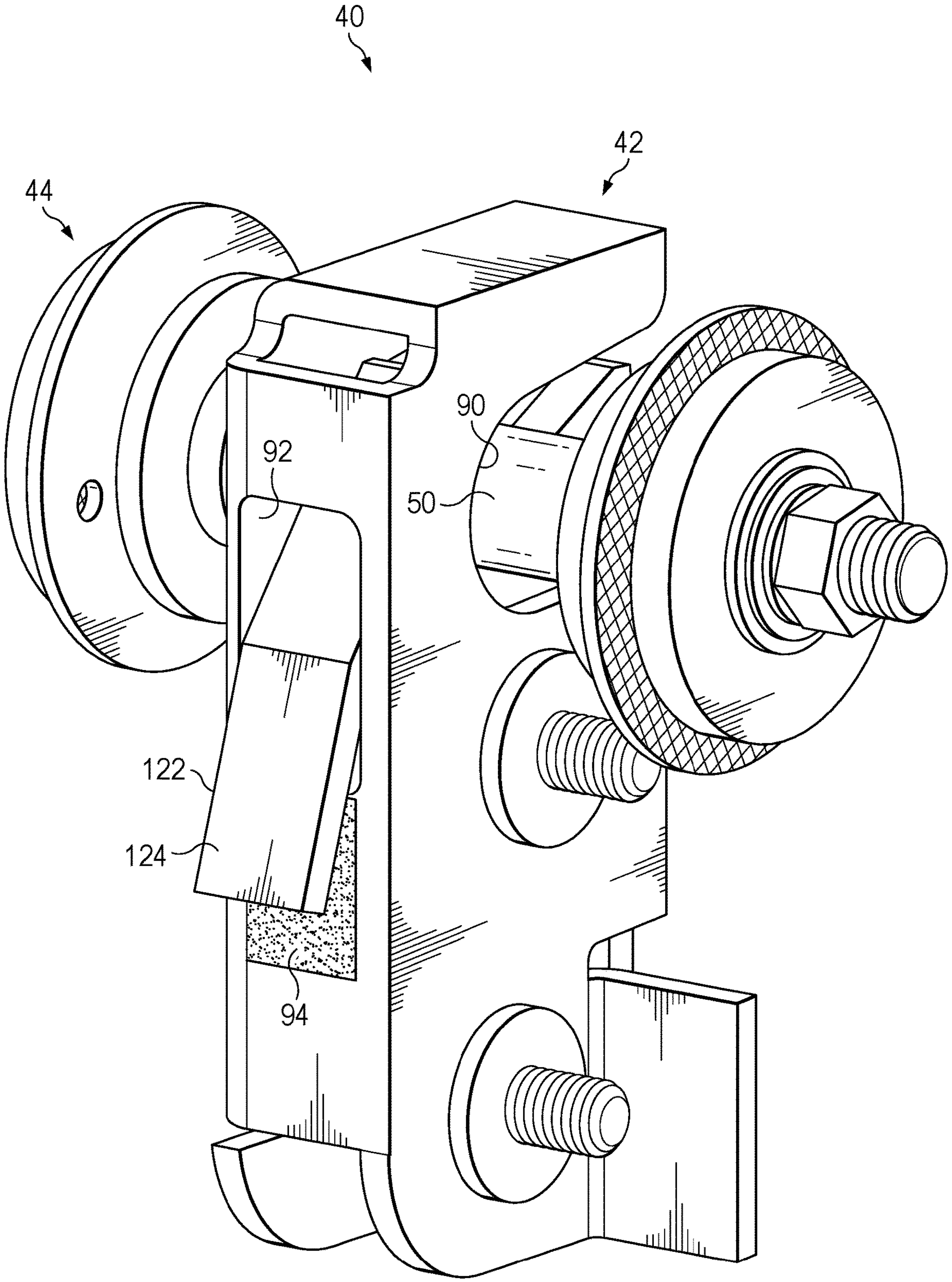
FIG. 9B is a perspective view of a portion of the latch mechanism of FIG. 3, showing the latch mechanism in a security state.
Figure 9C:
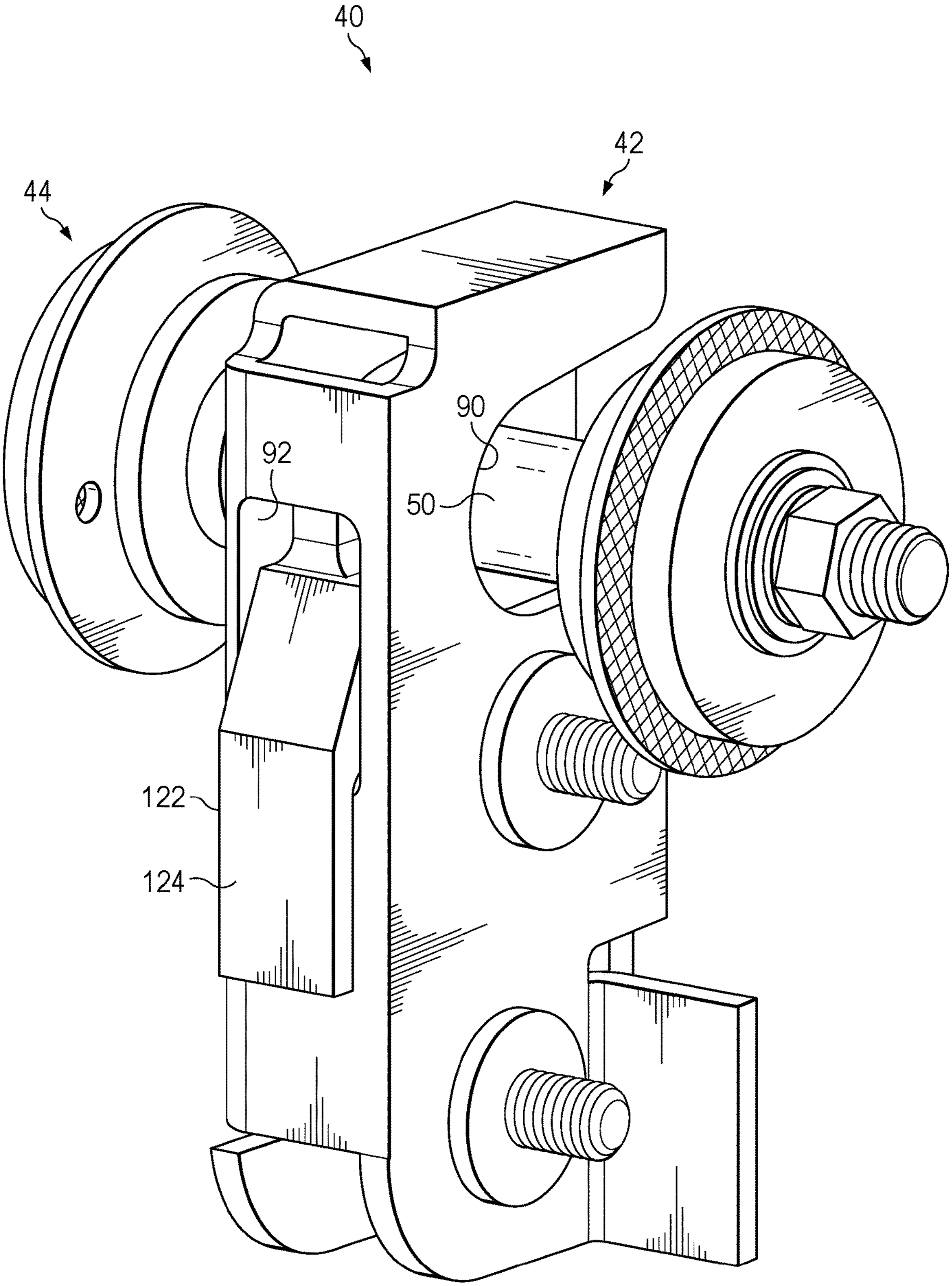
FIG. 9C is a perspective view of a portion of the latch mechanism of FIG. 3, showing the latch mechanism in a lock state.

Referring now to FIGS. 9A-9C, during an example of a method of use, latch mechanism (40) may initially be in the open state with catch (62) in the first orientation such that outboard surface (124) of hook (122) may substantially reveal indicator strip (94), as shown in FIG. 9A. Thus, only indicator strip (94) may be visible from the exterior of fuselage (12) through the corresponding porthole (28) and corresponding circular aperture (73), and a crew member may readily discern that latch mechanism (40) is in the open state based on the visual observation of substantially all of indicator strip (94) from the exterior of fuselage (12) through the corresponding porthole (28) and corresponding circular aperture (73); and/or that latch mechanism (40) is not in the lock state based on the visual observation of any portion of indicator strip (94) from the exterior of fuselage (12) through the corresponding porthole (28) and corresponding circular aperture (73). This may be the case when, for example, door (14) is in the open position such that striker pin (50) is not received by the corresponding C-shaped recesses (90) or U-shaped recess (110).

Latch mechanism (40) may subsequently be transitioned to the security state with catch (62) in the second orientation such that outboard surface (124) of hook (122) may only partially conceal indicator strip (94), as shown in FIG. 9B. Thus, only a portion of indicator strip (94) and a portion of outboard surface (124) may be visible from the exterior of fuselage (12) through the corresponding porthole (28) and corresponding circular aperture (73), and a crew member may readily discern that latch mechanism (40) is in the security state based on the visual observation of only a portion of indicator strip (94) and a portion of outboard surface (124) through the corresponding porthole (28) and corresponding circular aperture (73); and/or that latch mechanism (40) is not in the lock state based on the visual observation of any portion of indicator strip (94) from the exterior of fuselage (12) through the corresponding porthole (28) and corresponding circular aperture (73). This may be the case when, for example, door (14) is in the closed position or a partially closed position in which striker pin (50) is received by the corresponding C-shaped recesses but not securely captured therein by the corresponding U-shaped recess (110).

Latch mechanism (40) may then be transitioned to the lock state with catch (62) in the third orientation such that outboard surface (124) of hook (122) may substantially conceal indicator strip (94), as shown in FIG. 9C. Thus, only outboard surface (124) may be visible from the exterior of fuselage (12) through the corresponding porthole (28) and corresponding circular aperture (73), and a crew member may readily discern that latch mechanism (40) is in the lock state based on the visual observation of only outboard surface (124) through the corresponding porthole (28) and corresponding circular aperture (73), and/or based on a lack of visual observation of any portion of indicator strip (94) from the exterior of fuselage (12) through the corresponding porthole (28) and corresponding circular aperture (73). This may be the case when, for example, door (14) is in the closed position and striker pin (50) is received by the corresponding C-shaped recesses and securely captured therein by the corresponding U-shaped recess (110). Therefore, the crew member may confirm that door (14) is securely locked in the closed position based only on a visual inspection from the exterior of fuselage (12).

Abbreviated List of Defined Terms

To assist in understanding the scope and content of this written description and the appended claims, a select few terms are defined directly below. Unless defined otherwise, all technical and scientific terms used herein have the same meaning as commonly understood by one of ordinary skill in the art to which the present disclosure pertains.

The terms "approximately," "about," and "substantially," as used herein, represent an amount or condition close to the specific stated amount or condition that still performs a desired function or achieves a desired result. For example, the terms "approximately," "about," and "substantially" may refer to an amount or condition that deviates by less than 10%, or by less than 5%, or by less than 1%, or by less than 0.1%, or by less than 0.01% from a specifically stated amount or condition.

Certain embodiments of the present disclosure can comprise e.g., an open orientation in which the outboard surface of the hook at least partially reveals the indicator strip, and a lock orientation in which the outboard surface of the hook substantially conceals the indicator strip. For example, an outboard surface (124) of a hook (122) may substantially cover indicator strip (94) in the lock orientation. Generally, it is preferred that the indicator strip (94) is completely covered and not visible to a user in the lock orientation. However, embodiments may vary as to exactly how much of indicator strip (94) is visible in the lock orientation versus the open orientation. In some embodiments, it may be that at least 90% coverage of the indicator strip (94) indicates the locked orientation, or at least 80% coverage of the indicator strip (94) indicates the locked orientation.

Various aspects of the present disclosure, including devices, systems, and methods may be illustrated with reference to one or more embodiments or implementations, which are exemplary in nature. As used herein, the term "exemplary" means "serving as an example, instance, or illustration," and should not necessarily be construed as preferred or advantageous over other embodiments disclosed herein. In addition, reference to an "implementation" of the present disclosure or invention includes a specific reference to one or more embodiments thereof, and vice versa, and is intended to provide illustrative examples without limiting the scope of the invention, which is indicated by the appended claims rather than by the following description.

As used in the specification, a word appearing in the singular encompasses its plural counterpart, and a word appearing in the plural encompasses its singular counterpart, unless implicitly or explicitly understood or stated otherwise. Thus, it will be noted that, as used in this specification and the appended claims, the singular forms "a," "an" and "the" include plural referents unless the context clearly dictates otherwise. For example, reference to a singular referent (e.g., "a widget") includes one, two, or more referents unless implicitly or explicitly understood or stated otherwise. Similarly, reference to a plurality of referents should be interpreted as comprising a single referent and/or a plurality of referents unless the content and/or context clearly dictate otherwise. For example, reference to referents in the plural form (e.g., "widgets") does not necessarily require a plurality of such referents. Instead, it will be appreciated that independent of the inferred number of referents, one or more referents are contemplated herein unless stated otherwise.

As used herein, directional terms, such as "top," "bottom," "left," "right," "up," "down," "upper," "lower," "proximal," "distal," "adjacent," and the like are used herein solely to indicate relative directions and are not otherwise intended to limit the scope of the disclosure and/or claimed invention

CONCLUSION

It is understood that for any given component or embodiment described herein, any of the possible candidates or alternatives listed for that component may generally be used individually or in combination with one another, unless implicitly or explicitly understood or stated otherwise. Additionally, it will be understood that any list of such candidates or alternatives is merely illustrative, not limiting, unless implicitly or explicitly understood or stated otherwise.

In addition, unless otherwise indicated, numbers expressing quantities, constituents, distances, or other measurements used in the specification and claims are to be understood as being modified by the term "about," as that term is defined herein. Accordingly, unless indicated to the contrary, the numerical parameters set forth in the specification and attached claims are approximations that may vary depending upon the desired properties sought to be obtained by the subject matter presented herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the subject matter presented herein are approximations, the numerical values set forth in the specific examples are reported as precisely as possible. Any numerical values, however, inherently contain certain errors necessarily resulting from the standard deviation found in their respective testing measurements.

Any headings and subheadings used herein are for organizational purposes only and are not meant to be used to limit the scope of the description or the claims.

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention itemed. Thus, it should be understood that although the present invention has been specifically disclosed in part by preferred embodiments, exemplary embodiments, and optional features, modification and variation of the concepts herein disclosed may be resorted to by those skilled in the art, and such modifications and variations are considered to be within the scope of this invention as defined by the appended items. The specific embodiments provided herein are examples of useful embodiments of the present invention and various alterations and/or modifications of the inventive features illustrated herein, and additional applications of the principles illustrated herein that would occur to one skilled in the relevant art and having possession of this disclosure, can be made to the illustrated embodiments without departing from the spirit and scope of the invention as defined by the items and are to be considered within the scope of this disclosure.

It will also be appreciated that systems, devices, products, kits, methods, and/or processes, according to certain embodiments of the present disclosure may include, incorporate, or otherwise comprise properties or features (e.g., components, members, elements, parts, and/or portions) described in other embodiments disclosed and/or described herein. Accordingly, the various features of certain embodiments can be compatible with, combined with, included in, and/or incorporated into other embodiments of the present disclosure. Thus, disclosure of certain features relative to a specific embodiment of the present disclosure should not be construed as limiting application or inclusion of said features to the specific embodiment. Rather, it will be appreciated that other embodiments can also include said features, members, elements, parts, and/or portions without necessarily departing from the scope of the present disclosure.

Moreover, unless a feature is described as requiring another feature in combination therewith, any feature herein may be combined with any other feature of a same or different embodiment disclosed herein. Furthermore, various well-known aspects of illustrative systems, methods, apparatus, and the like are not described herein in particular detail in order to avoid obscuring aspects of the example embodiments. Such aspects are, however, also contemplated herein.

All references cited in this application are hereby incorporated in their entireties by reference to the extent that they are not inconsistent with the disclosure in this application. It will be apparent to one of ordinary skill in the art that methods, devices, device elements, materials, procedures, and techniques other than those specifically described herein can be applied to the practice of the invention as broadly disclosed herein without resort to undue experimentation. All art-known functional equivalents of methods, devices, device elements, materials, procedures, and techniques specifically described herein are intended to be encompassed by this invention.

When a group of materials, compositions, components, or compounds is disclosed herein, it is understood that all individual members of those groups and all subgroups thereof are disclosed separately. When a Markush group or other grouping is used herein, all individual members of the group and all combinations and sub-combinations possible of the group are intended to be individually included in the disclosure. Every formulation or combination of components described or exemplified herein can be used to practice the invention, unless otherwise stated. Whenever a range is given in the specification, for example, a temperature range, a time range, or a composition range, all intermediate ranges and subranges, as well as all individual values included in the ranges given are intended to be included in the disclosure. All changes which come within the meaning and range of equivalency of the items are to be embraced within their scope.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A latch mechanism for a door of an aircraft, the latch mechanism comprising:
- (a) a striker pin configured to be coupled to a doorframe of the aircraft; and
- (b) a catch assembly, wherein the catch assembly includes:
  - (i) a housing configured to be coupled to the door of the aircraft, wherein the housing includes:
    - (A) a rectangular aperture,
    - (B) an indicator strip proximate the rectangular aperture,
    - (C) a C-shaped recess configured to selectively receive the striker pin, and
    - (D) an upper support pin extending through the housing, and
  - (ii) a catch pivotably coupled to the housing about the upper support pin, wherein the catch includes:
    - (A) a U-shaped recess configured to selectively receive the striker pin, and
    - (B) a hook configured to extend at least partially through the rectangular aperture, wherein the hook includes an outboard surface configured to selectively cover the indicator strip,
  - wherein the catch is pivotable relative to the housing between at least an open orientation, a security orientation, and a locked orientation,
  - wherein in the open orientation the indicator strip is revealed and the U-shaped recess is oriented to face at least partially laterally inwardly relative to the longitudinal axis of the aircraft,
  - wherein in the security orientation the hook partially conceals the indicator strip and the U-shaped recess is oriented to face less laterally inwardly and more upwardly compared to the open orientation, and wherein in the lock orientation the hook conceals the indicator strip and the U-shaped recess is oriented to face upwardly and to coincide with an axis defined by the C-shaped recess, wherein the striker pin is received by the C-shaped recess and the U-shaped recess in the lock orientation.

2. The latch mechanism of claim 1, wherein the indicator strip is red.

3. The latch mechanism of claim 1, wherein the outboard surface of the hook is red.

4. The latch mechanism of claim 1, wherein the outboard surface of the hook has a width substantially equal to or greater than a width of the indicator strip, wherein the outboard surface of the hook has a height substantially equal to or greater than a height of the indicator strip.

5. The latch mechanism of claim 1, wherein the hook is generally L-shaped.

6. The latch mechanism of claim 1, wherein the catch assembly further includes a bracket configured to couple the housing to the door, wherein the bracket includes a circular aperture aligned with the indicator strip to permit visual observation of the indicator strip and whether the catch is in the open orientation, security orientation, and lock orientation.

7. The latch mechanism of claim 1, wherein the catch assembly further includes a cam pivotably coupled to the housing, wherein the cam is configured to pivot relative to the housing to thereby urge the catch between the open and lock orientations.

8. The latch mechanism of claim 7, wherein the catch includes a pair of notches, wherein the cam includes a tooth configured to selectively engage the notches.

9. An aircraft comprising:

(a) a fuselage, wherein the fuselage includes a doorframe;

(b) a door movably coupled to the doorframe; and (c) the latch mechanism of claim 1.

10. The aircraft of claim 9, wherein the door includes a porthole aligned with the indicator strip to permit visual observation of the indicator strip from an exterior of the fuselage through the porthole at least when the catch is in the open orientation.

11. The aircraft of claim 10, wherein the porthole extends from an internal side of the door to an external side of the door.

12. The aircraft of claim 10, wherein the porthole comprises a substantially transparent material.

13. The aircraft of claim 10, wherein the housing is coupled to the door via a bracket, wherein the bracket includes a circular aperture aligned with the porthole and the indicator strip to permit visual observation of the indicator strip through the circular aperture at least when the catch is in the open orientation.

14. The aircraft of claim 9, wherein the door includes a door handle operatively coupled to the catch for actuating pivoting of the catch between the open and lock orientations.

15. A catch assembly for a door of an aircraft, comprising:

(a) a housing configured to be coupled to the door of the aircraft, wherein the housing includes:

(i) a rectangular aperture, (ii) an indicator strip proximate the rectangular aperture;

(iii) a C-shaped recess configured to selectively receive the striker pin, and (iv) an upper support pin extending through the housing, and (b) a catch pivotably coupled to the housing about the upper support pin, wherein the catch includes:

(i) a U-shaped recess configured to selectively receive a striker pin of the aircraft, and (ii) a hook configured to extend at least partially through the rectangular aperture, wherein the hook includes an outboard surface configured to selectively cover the indicator strip, wherein the catch is pivotable relative to the housing between at least an open orientation, a security orientation, and a locked orientation, wherein in the open orientation the indicator strip is revealed and the U-shaped recess is oriented to face at least partially laterally inwardly relative to the longitudinal axis of the aircraft, wherein in the security orientation the hook partially conceals the indicator strip and the U-shaped recess is oriented to face less laterally inwardly and more upwardly compared to the open orientation, and wherein in the lock orientation the hook conceals the indicator strip and the U-shaped recess is oriented to face upwardly and to coincide with an axis defined by the C-shaped recess, wherein the striker pin is received by the C-shaped recess and the U-shaped recess in the lock orientation.

16. The catch assembly of claim 15, further comprising a bracket configured to couple the housing to the door of the aircraft, wherein the bracket includes a circular aperture aligned with the indicator strip to permit visual observation of the indicator strip through the circular aperture at least when the catch is in the open orientation.

17. The catch assembly of claim 15, further comprising a cam pivotably coupled to the housing, wherein the cam is configured to pivot relative to the housing to thereby urge the catch between the open and lock orientations.

* * * * *